US012686782B2

(12) United States Patent
Nauka et al.

(10) Patent No.: US 12,686,782 B2
(45) Date of Patent: *Jul. 21, 2026

(54) THREE-DIMENSIONAL PRINTING WITH METAL OXIDE NANOPARTICLE FUSING AGENTS

(71) Applicant: PERIDOT PRINT LLC, Palo Alto, CA (US)

(72) Inventors: Krzysztof Nauka, Palo Alto, CA (US); Vladek Kasperchik, Corvllis, OR (US)

(73) Assignee: Peridot Print LLC, Palo Alto, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/907,174

(22) Filed: Oct. 4, 2024

(65) Prior Publication Data

US 2025/0026944 A1      Jan. 23, 2025

Related U.S. Application Data

(63) Continuation of application No. 17/312,674, filed as application No. PCT/US2019/042116 on Jul. 17, 2019, now Pat. No. 12,110,404.

(51) Int. Cl.
B29C 64/291        (2017.01)
B33Y 30/00         (2015.01)
(Continued)

(52) U.S. Cl.
CPC .......... C09D 11/322 (2013.01); B29C 64/291 (2017.08); B33Y 30/00 (2014.12);
(Continued)

(58) Field of Classification Search
None
See application file for complete search history.

(56) References Cited

U.S. PATENT DOCUMENTS 7,635,504 B2    12/2009    Elwakil et al.
8,969,459 B2    3/2015     Chou et al.
(Continued)

FOREIGN PATENT DOCUMENTS

CN         108410292 A       8/2018
KR    10-2018-0071601 A      6/2018
(Continued)

OTHER PUBLICATIONS

Wikipedia, Titanium dioxide, avail at https://en.wikipedia.org/wiki/Titanium_dioxide, accessed Dec. 18, 2023.*
(Continued)

*Primary Examiner* — Yung-Sheng M Tsui
(74) *Attorney, Agent, or Firm* — Dierker & Kavanaugh, P.C.

(57)        ABSTRACT

This disclosure describes multi-fluid kits for three-dimensional printing, three-dimensional printing kits, and systems for three-dimensional printing. In one example, a multi-fluid kit for three-dimensional printing can include a fusing agent and a detailing agent. The fusing agent can include water and metal oxide nanoparticles dispersed therein. The metal oxide nanoparticles can be selected from titanium dioxide, zinc oxide, cerium oxide, indium tin oxide, or a combination (Continued)

thereof. The metal oxide nanoparticles can have an average particle size from about 2 nm to about 500 nm. The detailing agent can include a detailing compound.

10 Claims, 4 Drawing Sheets

(51) Int. Cl.

| | |
|---|---|
| B33Y 70/00 | (2020.01) |
| C01G 23/08 | (2006.01) |
| C09D 11/037 | (2014.01) |
| C09D 11/102 | (2014.01) |
| C09D 11/322 | (2014.01) |
| B29K 77/00 | (2006.01) |
| B29K 105/00 | (2006.01) |

(52) U.S. Cl.
CPC ............. B33Y 70/00 (2014.12); C01G 23/08 (2013.01); C09D 11/037 (2013.01); C09D 11/102 (2013.01); *B29K 2077/00* (2013.01); *B29K 2105/0032* (2013.01); *B29K 2105/251* (2013.01); *C01P 2004/62* (2013.01); *C01P 2004/64* (2013.01)

(56) References Cited

U.S. PATENT DOCUMENTS

| | | |
|---|---|---|
| 2004/0138363 A1 | 7/2004 | Baumann et al. |
| 2007/0241482 A1 | 10/2007 | Giller et al. |
| 2015/0251247 A1 | 9/2015 | Monsheimer et al. |
| 2017/0140880 A1 | 5/2017 | Kogure et al. |
| 2018/0147777 A1* | 5/2018 | Abbott, Jr. ............. B33Y 10/00 |
| 2018/0178447 A1 | 6/2018 | Abbott, Jr. et al. |
| 2019/0054690 A1 | 2/2019 | Feng et al. |
| 2019/0091936 A1 | 3/2019 | Fornos et al. |

FOREIGN PATENT DOCUMENTS

| | | | |
|---|---|---|---|
| WO | 2009/017648 A1 | 2/2009 | |
| WO | WO-2017069778 A1 * | 4/2017 | ............. B33Y 10/00 |
| WO | WO-2017188965 A1 * | 11/2017 | .......... B29C 64/165 |
| WO | 2019/013745 A1 | 1/2019 | |
| WO | 2019/069032 A1 | 4/2019 | |

OTHER PUBLICATIONS

Wikipedia, Titanium dioxide, avail at https://en.wikipedia.org/wiki/Titanium_dioxide, accessed Dec. 18, 2023 (Year: 2023).

* cited by examiner

100

200

300

THREE-DIMENSIONAL PRINTING WITH METAL OXIDE NANOPARTICLE FUSING AGENTS

CROSS REFERENCE TO RELATED APPLICATIONS

This application is a continuation of U.S. application Ser. No. 17/312,674, filed Jun. 10, 2021, which itself is a 371 National Stage Entry of International Application No. PCT/US2019/042116, filed Jul. 17, 2019, each of which is incorporated herein by reference in its entirety.

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Figure 1:
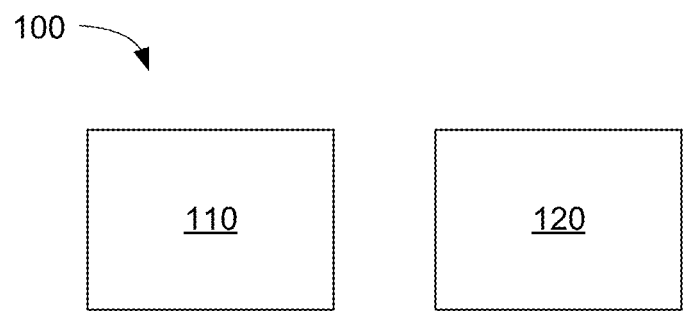
FIG. 1 is a schematic view of an example multi-fluid kit for three-dimensional printing in accordance with examples of the present disclosure.

The present disclosure describes multi-fluid kits for three-dimensional printing, three-dimensional printing kits, and systems for three-dimensional printing. In one example, a multi-fluid kit for three-dimensional printing can include a fusing agent and a detailing agent. The fusing agent can include water and metal oxide nanoparticles dispersed therein. The metal oxide nanoparticles can be selected from titanium dioxide, zinc oxide, cerium oxide, indium tin oxide, or a combination thereof. The metal oxide nanoparticles can have an average particle size from about 2 nm to about 500 nm. The detailing agent can include a detailing compound. In some examples, a layer of the fusing agent having a thickness of 0.5 µm after liquid components have been removed absorbs from 90% to 100% of radiant electromagnetic energy having a wavelength within an absorption wavelength range from about 300 nm to about 400 nm, and the layer of the fusing agent can absorb or reflect from 0% to 20% of radiant electromagnetic energy in a transmission wavelength range from above the about 400 nm to about 700 nm. In further examples, the metal oxide nanoparticles can be present in the fusing agent in an amount from about 0.5 wt % to about 30 wt %. In other examples, the multi-fluid kit can also include a colored agent separate from the fusing agent and the detailing compound, the colored agent including water and a colorant.

The present disclosure also describes three-dimensional printing kits. In one example, a three-dimensional printing kit can include a fusing agent and a powder bed material. The powder bed material can include polymer particles. The fusing agent can include water and metal oxide nanoparticles dispersed therein, wherein the metal oxide nanoparticle are selected from titanium dioxide, zinc oxide, cerium oxide, indium tin oxide, or a combination thereof. The metal oxide nanoparticles can have an average particle size from about 2 nm to about 500 nm. In some examples, a layer of the fusing agent having a thickness of 0.5 µm after liquid components have been removed absorbs from 90% to 100% of radiant electromagnetic energy having a wavelength with an absorption wavelength range from about 300 nm to about 400 nm, and the layer of the fusing agent absorbs or reflects from 0% to 20% of radiant electromagnetic energy in a transmission wavelength range from above the about 400 nm to about 700 nm. In further examples, a layer of the powder bed material having a thickness of 80 µm can absorb from 0 to 20% of electromagnetic energy absorption within the absorption wavelength range from about 300 nm to about 400 nm. In certain examples, the polymer particles can include polyamide 12. In still further examples, the powder bed material can be devoid of filler that absorbs electromagnetic energy within the absorption wavelength range. In other examples, the three-dimensional printing kit can also include a detailing agent including a detailing compound. In yet other examples, the three-dimensional printing kit can include multiple colored agents separate from the fusing agent, the multiple colored agents independently including water and colorant.

The present disclosure also describes systems for three-dimensional printing. In one example, a system for three-dimensional printing can include a fusing agent, a powder bed material, and a radiant electromagnetic energy source. The fusing agent can include water and metal oxide nanoparticles dispersed therein A layer of the fusing agent having a thickness of 0.5 µm after liquid components have been removed absorbs from 90% to 100% of radiant electromagnetic energy having a wavelength within an absorption wavelength range from about 300 nm to about 400 nm, and the layer of the fusing agent absorbs from 0% to 20% of radiant electromagnetic energy in a transmission wavelength range from above the about 400 nm to about 700 nm. The powder bed material can include polymer particles, wherein a layer of the powder bed material having a thickness of 80 µm absorbs from 0 to 20% of electromagnetic energy within the absorption wavelength range from about 300 nm to about 400 nm. The radiant electromagnetic energy source can emit about 80% to 100% electromagnetic energy within the absorption wavelength range. The radiant electromagnetic energy source can be positioned to expose a layer of powder bed material to the electromagnetic energy to selectively fuse the polymer particles in contact with the metal oxide nanoparticles. In some examples, the radiant electromagnetic energy source can include a narrow band light emitting diode having a peak emission at about 365 nm, about 385 nm, about 395 nm, or about 405 nm. In further examples, the metal oxide nanoparticles can include titanium dioxide, zinc oxide, cerium oxide, indium tin oxide, or a combination thereof and the metal oxide nanoparticles can have an average particle size from about 2 nm to about 500 nm. In other examples, the system can also include a detailing agent ejectable onto the layer of powder bed material, a colored agent ejectable onto the layer of powder bed material, or a combination thereof, wherein the detailing agent includes a detailing compound, and wherein the colored agent includes water and a colorant.

The materials and systems described above can be used to produce polymer three-dimensional (3D) printed articles. The 3D printing processes described herein generally include applying a fusing agent to a powder bed material that includes polymer particles. The fusing agent can include metal oxide nanoparticles, such as titanium dioxide, zinc oxide, cerium oxide, indium tin oxide, or combinations thereof. These nanoparticles can be efficient absorbers of certain wavelengths of electromagnetic radiation. In particular, these nanoparticles can strongly absorb ultra-violet (UV) wavelengths. Absorbed UV radiation is then converted into heat transported into adjacent medium and causing its heating. In some cases, the nanoparticles can absorb a small amount of visible light. However, the nanoparticles can generally be mostly transparent or reflective to visible light across most of the visible light spectrum. After applying the fusing agent, a UV radiation source can be used to irradiate the powder bed. The areas of the powder bed where the fusing agent was applied are then selectively heated to a melting or softening point temperature of the polymer particles so that the polymer particles fuse together to form a solid layer of the final 3D printed article Using the fusing agents that include metal oxide nanoparticles can enhance the operation and energy efficiency of the 3D printing processes described herein. In some cases, fusing agents used previously in this type of 3D printing process have included radiation absorbers that absorb electromagnetic radiation across a wider range of wavelengths. For example, black pigments can be good absorbers of a wide range of wavelengths, including near infrared, visible, and near-UV light. However, because black pigments absorb visible light, the 3D printed articles made using black pigment fusing agents are uniformly black in color. By using metal oxide nanoparticles in the fusing agent as described herein, the process can form 3D printed articles that are not colored by the fusing agent. Accordingly, the 3D printed article can be clear or white, depending on the color of the powder bed material. Alternatively, the 3D printed article can be colored any desired color or combination of colors by using additional coloring agents. Therefore, the metal oxide nanoparticles can allow for printing full color 3D printed articles.

Additionally, the metal oxide nanoparticles can absorb radiation strongly in a wavelength that is not absorbed by the polymer powder bed material. Many types of polymer powder used in the 3D printing processes described herein either do not absorb UV radiation or absorb a small amount of UV radiation. The metal oxide nanoparticles can absorb UV radiation much more efficiently that the powder bed material. This can make it easier to achieve a high temperature difference between powder bed material that has been printed with the fusing agent and powder bed material that is unprinted. Areas of the powder bed where the metal oxide nanoparticles are present can heat up very quickly when UV radiation is applied, whereas the areas without any metal oxide nanoparticles can heat up much more slowly. Therefore, individual layers of the 3D printed article can be formed with high selectivity between the areas of powder bed material that are to be fused and areas that are not to be fused. In comparison, many types of polymer powder can absorb a significant amount of radiation in the infrared range. Accordingly, it can be difficult to have high selectivity when using an infrared radiation absorber and an infrared radiation source, because the infrared radiation can heat up the polymer powder itself along with the radiation absorber.

The metal oxide nanoparticles described herein can also increase the energy efficiency of the 3D printed process. Because the metal oxide nanoparticles can absorb UV radiation so efficiently, a smaller amount of energy can be spent on the UV radiation source to achieve fusing of the polymer powder. Additionally, in some examples the amount of energy used for preheating the powder bed can be reduced because the polymer powder can be heated and fused more quickly starting from a lower initial temperature.

Multi-Fluid Kits for Three-Dimensional Printing

With this description in mind, FIG. 1 shows a schematic of an example multi-fluid kit for three-dimensional printing 100. The kit includes a fusing agent 110 and a detailing agent 120. The fusing agent can include water and metal oxide nanoparticles dispersed therein. The metal oxide nanoparticles can be titanium dioxide, zinc oxide, cerium oxide, indium tin oxide, or a combination thereof. The average particle size of the metal oxide nanoparticles can be from about 2 nm to about 500 nm. The detailing agent can include a detailing compound. Generally, the detailing compound can be a compound that can reduce the temperature of powder bed material onto which the detailing agent is applied. For example, the detailing compound can be a solvent that evaporates at a temperature below the temperature of the powder bed material, so that the powder bed material is evaporatively cooled by the detailing compound.

In some examples, the detailing agent can be applied in any areas where cooling of the powder bed material is desired. In certain examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

As explained above, the metal oxide nanoparticles in the fusing agent can strongly absorb UV radiation while also being mostly transparent to visible wavelengths. In some examples, a layer of the fusing agent 0.5 μm thick after liquid components have been removed can absorb from 90% to 100% of radiant electromagnetic energy in the wavelength range between about 300 nm and about 400 nm. In other words, a hypothetical layer of the fusing agent can be formed and dried to make a 0.5 μm thick layer of the solid components of the fusing agent, including the metal oxide nanoparticles. This layer can absorb 90% to 100% of electromagnetic energy from 300 nm to 400 nm. Thus, the metal oxide nanoparticles can absorb most of the radiation in the UV spectrum. The metal oxide nanoparticles can also absorb from 0% to 20% of radiant electromagnetic energy in the wavelength range from above the about 400 nm and about 700. Thus, the metal oxide nanoparticles can be transparent or mostly transparent to visible light.

Figure 2:
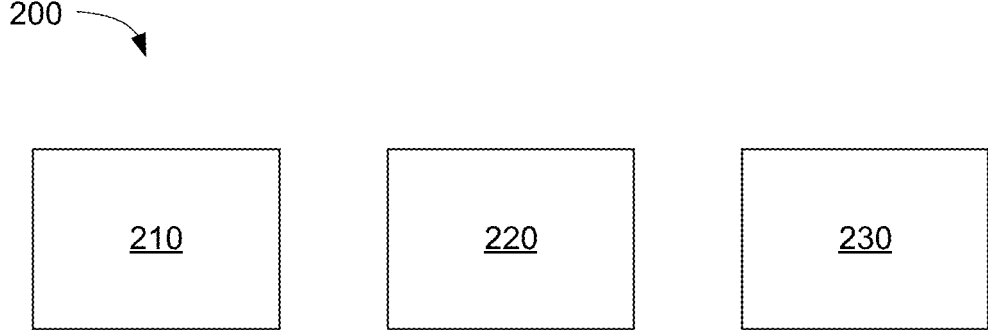
FIG. 2 is a schematic view of another example multi-fluid kit for three-dimensional printing in accordance with examples of the present disclosure.

FIG. 2 shows another example multi-fluid kit for three-dimensional printing. This example includes a fusing agent 210, a detailing agent 220, and a colored agent 230. The fusing agent and the detailing agent can have the same ingredients as in the example of FIG. 1. The colored agent can include water and a colorant. The colored agent can be selectively applied to any areas of the powder bed that are desired to be colored. Thus, a 3D printed article can be formed that is colored in any desired pattern. In further examples, multiple colored agents can be used to make multiple different colors.

The ingredients and properties of the fusing agent, detailing agent, and colored agents are described in more detail below. Three-dimensional Printing Kits The present disclosure also describes three-dimensional printing kits that can include fluid agents such as those described in the multi-fluid kits above, and powder bed material to use as a build material for forming 3D printed articles. In some examples, a three-dimensional printing kit can include a fusing agent and a powder bed material. The powder bed material can include polymer particles. The fusing agent can include water and metal oxide nanoparticles dispersed therein. The metal oxide nanoparticles can be titanium dioxide, zinc oxide, cerium oxide, indium tin oxide, or a combination thereof, and the metal oxide nanoparticles can have an average particle size from about 2 nm to about 500 nm.

Figure 3:
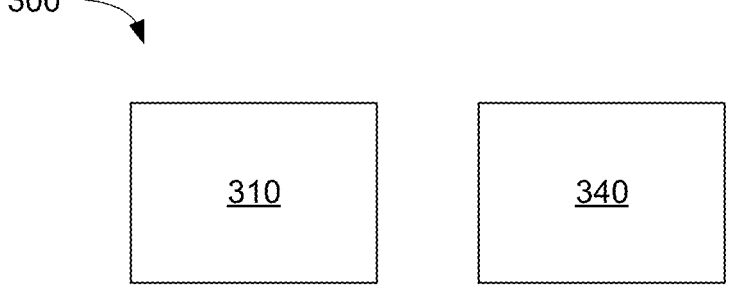
FIG. 3 is a schematic view of an example three-dimensional printing kit in accordance with examples of the present disclosure

FIG. 3 is a schematic of one example three-dimensional printing kit 300. This three-dimensional printing kit includes a fusing agent 310 and a powder bed material 340. The fusing agent can include the ingredients described above. The powder bed material can include polymer particles. In some examples, the polymer particles can be made of a polymer that is transparent or mostly transparent to UV wavelengths. For example, a layer of the powder bed material having a thickness of 20 μm can absorb from 0% to 20% of electromagnetic energy within an absorption wavelength range from about 300 nm to about 400 nm.

Figure 4:
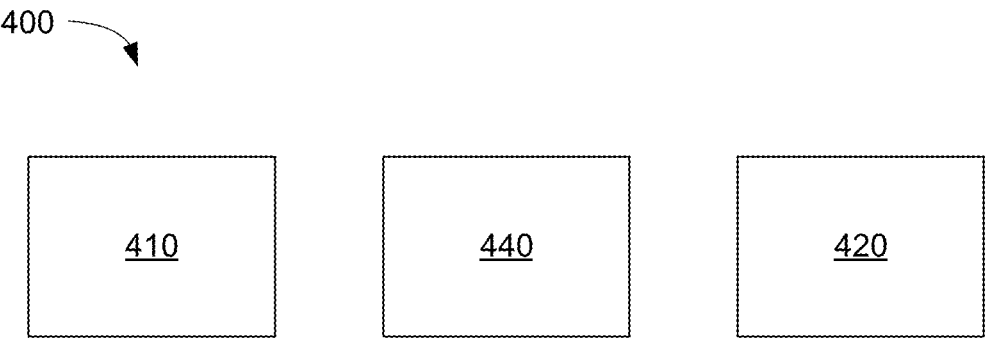
FIG. 4 is a schematic view of another example three-dimensional printing kit in accordance with examples of the present disclosure.

Another example is shown in FIG. 4. This figure shows an example three-dimensional printing kit 400 that includes a fusing agent 410, a powder bed material 440, and a detailing agent 420. The fusing agent and the detailing agent can be selectively applied to the powder bed material. The powder bed material, fusing agent, and detailing agent can include the same ingredients as in the examples above.

Figure 5:
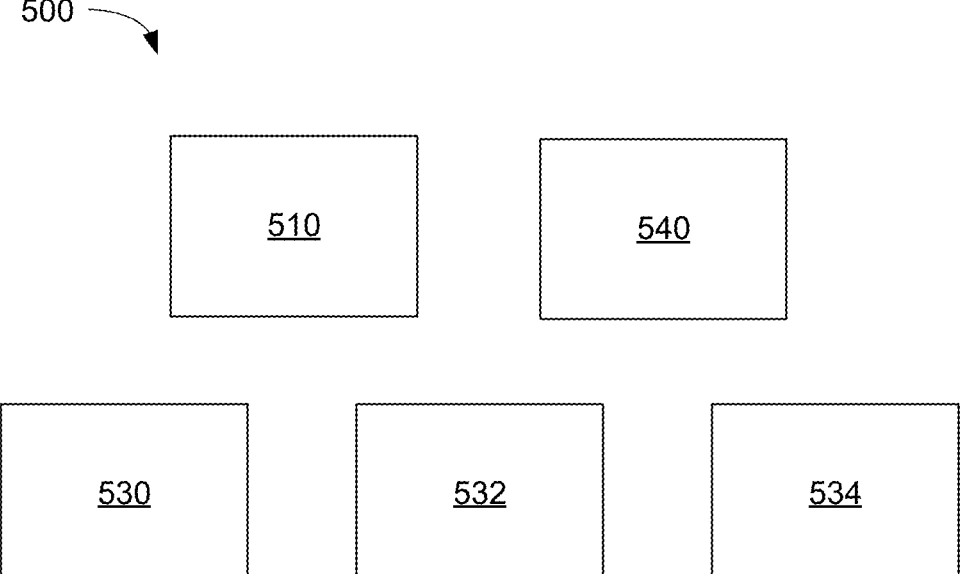
FIG. 5 is a schematic view of another example three-dimensional printing kit in accordance with examples of the present disclosure.

FIG. 5 shows yet another example three-dimensional printing kit 500. This example includes a fusing agent 510, a powder bed material 540, and colored agents 530, 532, and 534. The colored agents can each include water and a different colorant. In one example, the colored agents can include a cyan colored agent, a magenta colored agent, and a yellow colored agent. These colored agents can be selectively applied during 3D printing to produce full-color 3D printed articles. Other color combinations can also be used.

Figure 6A:
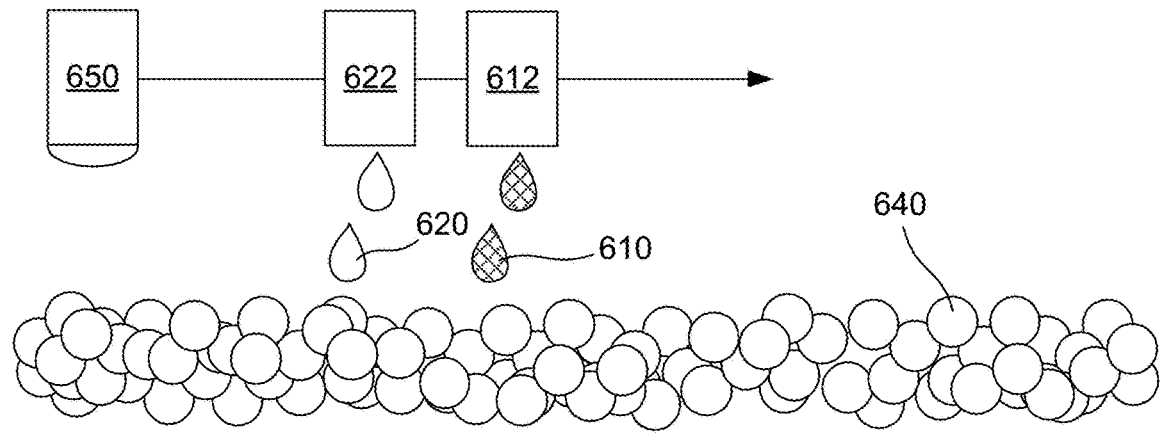
FIGS. 6A-6C show a schematic view of an example three-dimensional printing process using an example three-dimensional printing kit in accordance with examples of the present disclosure.
Figure 6B:
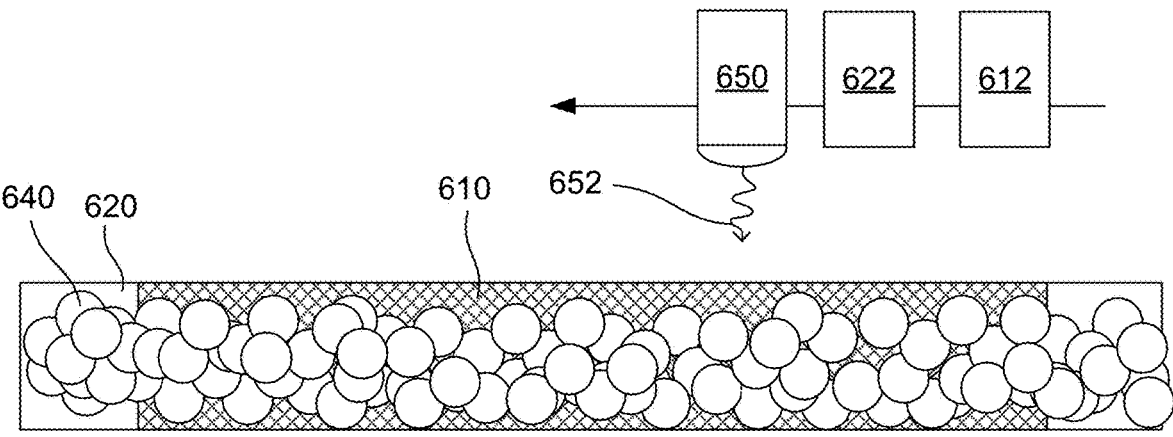
Figure 6C:
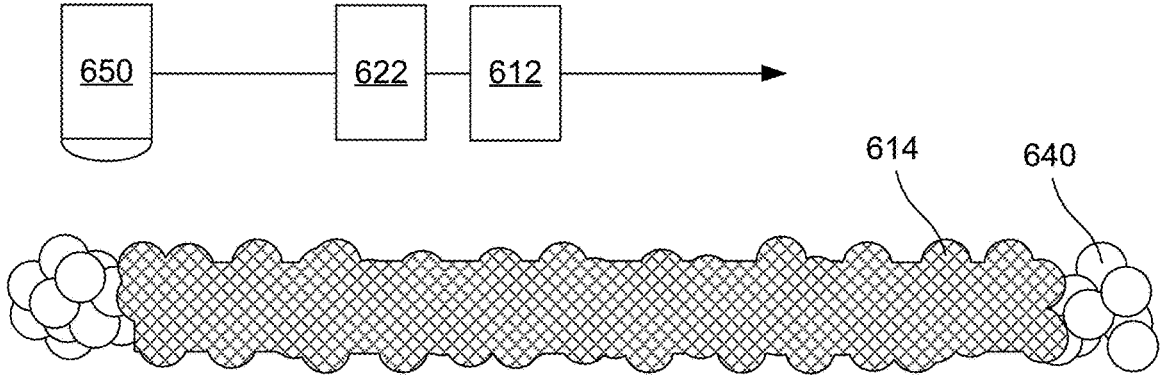

FIGS. 6A-6C illustrate one example of using the three-dimensional printing kits to form a 3D printed article. In FIG. 6A, a fusing agent 610 and a detailing agent 620 are jetted onto a layer of powder bed material 640 made up of polymer particles. The fusing agent is jetted from a fusing agent ejector 612 and the detailing agent is jetted from a detailing agent ejector 622. These fluid ejectors can move across the layer of powder bed material to selectively jet fusing agent on areas that are to be fused, while the detailing agent can be jetted onto areas that are to be cooled. In some cases, the detailing agent can be jetted around edges of the area where the fusing agent was jetted to prevent the surrounding powder bed material from caking. In other examples, the detailing agent can be jetted onto a portion of the same area where the fusing agent was jetted to prevent overheating of the powder bed material. A UV radiation source 650 can also move across the layer of powder bed material.

FIG. 6B shows the layer of powder bed material after the fusing agent 610 has been jetted onto an area of the layer that is to be fused. Additionally, the detailing agent 620 has been jetted onto areas of the powder bed adjacent to edges of the area where the fusing agent was jetted. In this figure, the UV radiation source 650 is shown emitting UV radiation 652 toward the layer of powder bed material 640. The metal oxide nanoparticles in the fusing agent can absorb the UV radiation and produce heat to fuse the polymer particles where the fusing agent was jetted.

FIG. 6C shows the layer of powder bed material with a fused portion 614 where the fusing agent was jetted. This portion has reached a sufficient temperature to fuse the polymer particles together to form a solid polymer matrix. The area where the detailing agent was jetted remains as loose powder. In this example, the detailing agent evaporates to evaporatively cool the polymer particles, which can help produce a well-defined edge of the fused layer by reducing partially fused or caked powder particles around the edges.

Powder Bed Material

The powder bed material can include polymer particles. In certain examples, the powder bed material can include polymer particles having a variety of shapes, such as substantially spherical particles or irregularly-shaped particles. In some examples, the polymer powder can be capable of being formed into 3D printed objects with a resolution of about 20 μm to about 100 μm, about 30 μm to about 90 μm, or about 40 μm to about 80 μm. As used herein, "resolution" refers to the size of the smallest feature that can be formed on a 3D printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. However, the polymer powder can also absorb a small amount of radiant energy in the wavelength range from about 300 nm to about 400 nm. In some examples, the polymer powder can be polyamide 12 powder, which can have a melting point from about 175° C. to about 200° C.

In various examples, the powder bed material can be transparent or mostly transparent to radiation in the wavelength range from about 300 nm to about 400 nm. This can correspond to the wavelength of radiation that is applied during the fusing process in the 3D printing process. In other words, the powder bed can be irradiated with a wavelength of radiation in the range of about 300 nm to about 400 nm. When the powder bed material is transparent or mostly transparent to these wavelengths, then the powder bed material does not absorb the wavelengths and convert the radiant energy to heat. In practice, many polymers can absorb a small amount of the radiation and produce a small amount of heat. However, the metal oxide nanoparticles in the fusing agent can absorb much more of the radiant energy so that any powder bed material that has been jetted with fusing agent can heat up much more quickly than the powder bed material that has not be jetted with fusing agent.

In some examples, powder bed material can be sufficiently transparent to the wavelengths from about 300 nm to about 400 nm that a layer of the powder bed material having a thickness of 20 μm can absorb from 0% to 20% of electromagnetic energy within the wavelength range from about 300 nm to about 400 nm. In further examples, a layer of powder bed material having a thickness of 20 μm can absorb from 0% to 10% of electromagnetic energy within the wavelength range from about 300 nm to about 400 nm.

The powder bed material can also in some cases include a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

In further examples, if the powder bed material includes a filler, the filler can be a material that does not absorb UV wavelengths. If the filler strongly absorbs UV wavelengths, then the filler can act as a fusing agent and potentially cause the powder bed material to fuse together even when no other fusing agent was jetted thereon. Accordingly, in some examples the powder bed material can be devoid of fillers that absorb the wavelength of electromagnetic energy that is applied during the 3D printing process. In further examples, if the powder bed material includes any fillers that absorb UV wavelengths, the fillers can be included in small amounts so that a 20 μm layer of the powder bed material as a whole still absorbs from 0% to 20% of the radiation having wavelengths from 300 nm to 400 nm Fusing Agents The multi-fluid kits and three-dimensional printing kits described herein can include a fusing agent to be applied to the powder bed build material. The fusing agent can include metal oxide nanoparticles. The metal oxide nanoparticles can absorb radiant electromagnetic energy having a wavelength from about 300 nm to about 400 nm. In some examples, the amount of electromagnetic energy absorbed by the fusing agent can be quantified as follows: a layer of the fusing agent having a thickness of 0.5 μm after liquid components have been removed can absorb from 90% to 100% of radiant electromagnetic energy having a wavelength within an absorption wavelength range from about 300 nm to about 400 nm. This range is referred to as an "absorption wavelength range" merely to describe the fact that most of the energy in this range is absorbed by the fusing agent. Therefore, the metal oxide nanoparticles can strongly absorb UV electromagnetic energy. In further examples, the 0.5 μm layer can absorb from 90% to 99%, or from 90% to 95%, or from 95% to 99%, or from 95% to 100% of the electromagnetic energy in this wavelength range.

In further examples, the 0.5 μm layer of the fusing agent can absorb from 0% to 20% of radiant electromagnetic energy in a transmission wavelength range from above the about 400 nm to about 700 nm. This is referred to as a "transmission wavelength range" merely to describe the fact that most of the energy within this range is transmitted by the fusing agent. This corresponds to most visible light wavelengths. The metal oxide nanoparticles can be transparent or mostly transparent to visible. Therefore, the metal oxide nanoparticles can be colorless or have a faint color. In further examples, the 0.5 μm layer of the fusing agent can absorb from 0% to 20%, or from 0% to 10%, or from 5% to 40%, or from 5% to 20%, of the electromagnetic energy having a wavelength from about 400 nm to about 700 nm.

The wavelengths that are used to irradiate the powder bed during 3D printing as described herein are generally referred to as "UV" wavelengths. However, strictly speaking, the wavelengths used in the 3D printing can cross over slightly into the visible range. For example, in some cases a wavelength of 400 nm can be considered to be in the visible spectrum. In some examples, a wavelength from 300 nm to 400 nm can be used in the 3D printed process. Thus, in some examples the wavelength range can cross over into the visible spectrum. More specifically, in some examples the metal oxide nanoparticles can strongly absorb wavelengths in the "near ultraviolet" range (300 nm to 400 nm), the "ultraviolet A" range (315 nm to 400 nm), and part of the "ultraviolet B" range (280 nm to 315 nm).

In some examples, the metal oxide nanoparticles can be titanium dioxide, zinc oxide, cerium oxide, indium tin oxide, or a combination thereof. In further examples, the metal oxide nanoparticles can have an average particle size from about 2 nm to about 500 nm. In still further examples, the metal oxide nanoparticles can have an average particle size from about 2 nm to 300 nm, from about 10 nm to about 100 nm, or from about 10 nm to about 60 nm.

The fusing agent can be used with a powder bed material in the 3D printing processes described herein. In one example, a thin layer of powder bed material can be formed, and then the fusing agent can be selectively applied to areas of the powder bed material that are desired to be consolidated to become part of the solid 3D printed article. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. In some examples, liquid components of the fusing agent can be allowed to evaporate before irradiating the powder bed. For example, the powder bed can be preheated so that the liquid of the fusing agent evaporates quickly. When the powder bed is irradiated, the metal oxide nanoparticles from the fusing agent can absorb the energy and convert it to heat, thereby heating any polymer particles in contact with the metal oxide nanoparticles. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of metal oxide nanoparticles in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process. As mentioned above, the metal oxide nanoparticles can generally provided better selectivity compared to infrared-absorbing materials that can otherwise be used in fusing agents.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

A dispersant can be included in the fusing agent in some examples. Dispersants can help disperse the metal oxide nanoparticles. Non-limiting examples of dispersants that can be included can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of metal oxide nanoparticles in the fusing agent can vary depending on the amount of fusing agent that is to be applied to the powder bed material, the amount of heat to be generated to fuse the powder bed material, and other factors. In some examples, the concentration of metal oxide nanoparticles in the fusing agent can be from about 0.5 wt % to about 30 wt % with respect to the total weight of the fusing agent. In further examples, concentration can be from about 1 wt % to about 25 wt %, from about 5 wt % to about 20 wt %, or from about 10 wt % to about 20 wt. In one example, the metal oxide nanoparticles can have a concentration in the fusing agent such that after the fusing agent is jetted onto the polymer powder, the amount of metal oxide nanoparticles in the polymer powder can be from about 0.0003 wt % to about 10 wt %, or from about 0.005 wt % to about 5 wt %, with respect to the weight of the powder bed material.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, the metal oxide nanoparticles can be in the form of an aqueous dispersion. An organic co-solvent may be used in some examples, or may be absent in other examples. Therefore, in some examples the fluids can be substantially free of organic solvent, e.g., predominantly water. However, in other examples a co-solvent can be used to enhance the jetting properties of the respective fluids. In still further examples, a non-aqueous vehicle can be used with an organic-dispersible metal oxide nanoparticle dispersion.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di) esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N, N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of metal oxide nanoparticles or other radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Colored Agents

The multi-fluid kits and three-dimensional printing kits can include colored agents to print colored 3D articles. The colored agents can include water and a colorant. As used herein, "colorant" includes dyes, pigments, and/or other particulates that may be suspended or dissolved in an ink vehicle. In some examples, the colorant can be present in the colored agents in an amount from 0.5 wt. % to 10 wt. % in the ink. In one example, the colorant can be present in an amount from 1 wt. % to 5 wt. %. In another example, the colorant can be present in an amount from 5 wt. % to 10 wt. %. In some other examples, the colored agents can include pigments as colorants. Pigments that can be used include self-dispersed pigments and non self-dispersed pigments. The pigment can be self-dispersed with a polymer, oligomer, or small molecule; or can be dispersed with a separate dispersant. Non-limiting examples of suitable pigments can include black pigments, white pigments, cyan pigments, magenta pigments, yellow pigments, or the like. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal® Yellow 3G, Chromophtal®) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black.

In other examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

The colored agents can also include ingredients to allow the colored agents to be jetted by a fluid jet printhead. In some examples, the colored agents can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above. Additionally, in some examples, colorants can be added to the fusing agent to make a colored fusing agent. This can function as both a fusing agent and a colored agent.

Systems for Three-Dimensional Printing

Figure 7:
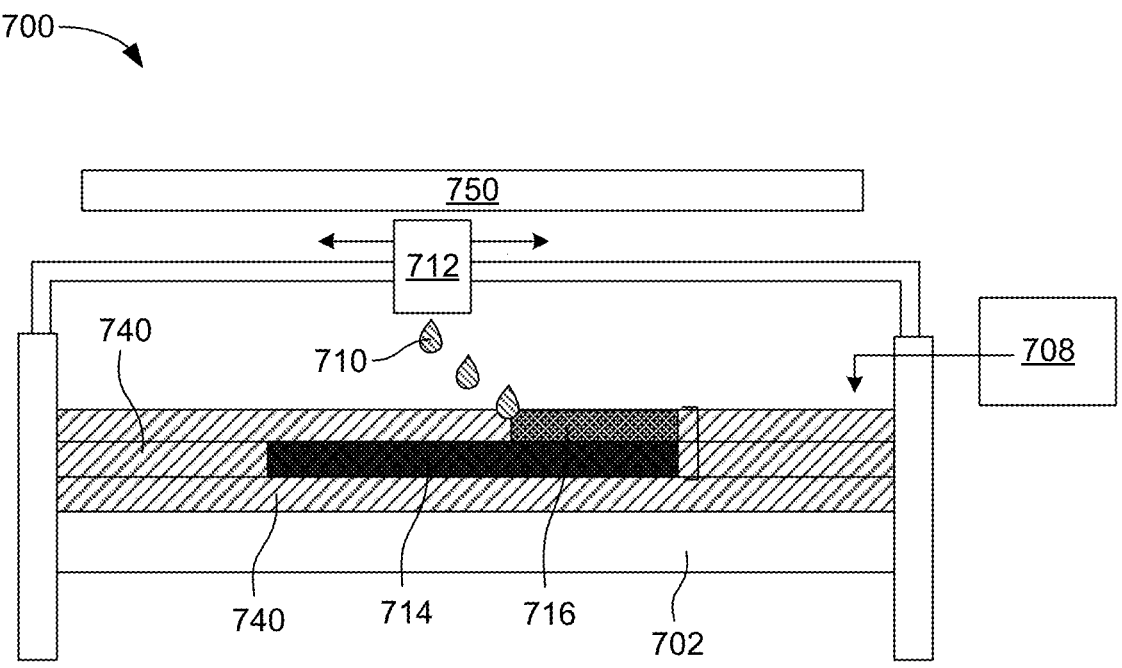
FIG. 7 is a schematic view of an example system for three-dimensional printing in accordance with examples of the present disclosure.

The present disclosure also extends to systems for three-dimensional printing. The systems can generally include the powder bed material and the fusing agent described above. The systems can also include a radiant energy source positioned to expose the powder bed material to radiation to selectively fuse the polymer particles in contact with the radiation absorber from the fusing agent. In some examples, the powder bed material can be distributed in individual layers by a build material applicator, and the fusing agent can be jetted onto the layers by a fluid ejector. FIG. 7 shows an example system 700 for three-dimensional printing in accordance with the present disclosure. The system includes a build platform 702. Powder bed material 740 can be deposited onto the build platform by a build material applicator 708 where the powder bed material can be flattened or smoothed, such as by a mechanical roller or other flattening technique. This can form a flat layer of powder bed material. The fusing agent 710 can then be applied to the layer by a fluid ejector 712. The fusing agent can include metal oxide nanoparticles as described above. The area 716 where the fusing agent is applied can correspond to a layer or slice of a 3D object model. The system can include a radiant energy source 750 that can apply radiation at a wavelength that is absorbed by the metal oxide nanoparticles to heat to the layers of powder bed material and fusing agent that has been applied. In this particular example, the system includes a radiant energy source that can irradiate the entire powder bed at once instead of a moveable radiant energy source that moves across the powder bed. The radiant energy source can heat the powder bed material and fusing agent until the powder bed material on which the fusing agent was printed reaches a melting or softening point temperature of the powder bed material. The polymer particles can fuse together to form a solid polymer matrix 714. In this figure, one layer of solid polymer matrix has already been formed and then a layer of additional powder bed material has been spread over the top of the solid layer. The figure shows the fusing agent being applied to the additional layer, which can then subsequently bed heated and fused to add another solid layer to the three-dimensional printed article.

As used herein, "applying individual build material layers of polymer particles to a powder bed" can include applying the first layer of powder bed material that is applied directly to an empty support bed. The "support bed" can refer to the build platform, as shown in FIG. 7, for example. Additionally, in some examples, a layer or multiple layers of powder bed material can be laid on the support bed without jetting any fusing agent onto the layers. This can provide a more thermally uniform temperature profile for the first layer to have the fusing agent jetted thereon. Accordingly, "applying individual build material layers of polymer particles to a powder bed" can include applying a layer of powder bed material onto the initial layer or layers that may be applied without any fusing agent. The phrase "applying individual build material layers of polymer particles to a powder bed" also includes applying to subsequent layers, when a layer or slice of the three-dimensional printed article has already been formed in the layer below.

In further examples, the system can include a radiant energy source. The radiant energy source can be positioned above the powder bed material as in FIG. 7, or in other examples the heater can be on a side or sides of the powder bed material, or a combination of these locations. In some examples, the support bed can include an additional integrated heater to heat the powder bed material from below to maintain a more uniform temperature in the powder bed. The radiant energy source can be used to heat the areas of the powder bed where fusing agent has been applied to fuse the polymer particles in those areas. In certain examples, the radiant energy source heater can include a UV radiation source. The radiant energy source can include a UV lamp, light emitting diodes, or any other source of radiation having a wavelength from about 300 nm to about 400 nm. In certain examples, the radiant energy source can include a narrow band light emitting diode. The peak emission of the light emitting diode can be at about 365 nm, about 385 nm, about 395 nm, or about 405 nm. In further examples, the radiant energy source can be mounted on a carriage to move across the powder bed. In certain examples, the fusing agent ejector and the radiant energy source can both be mounted on a carriage to move across the powder bed. For example, the fusing agent can be jetted from the fusing agent ejector on a forward pass of the carriage, and the radiant energy source can be activated to irradiate the powder bed on a return pass of the carriage. A detailing agent ejector and any other fluid ejectors in the system can also be mounted on the carriage.

The fusing agent, detailing agent, and/or colored agents can be jetted onto the powder bed using fluid jet print heads. The amount of the fusing agent used can be calibrated based the concentration of metal oxide nanoparticles in the fusing agent, the level of fusing desired for the polymer particles, and other factors. In some examples, the amount of fusing agent printed can be sufficient to contact the metal oxide nanoparticles with the entire layer of polymer powder. For example, if each layer of polymer powder is 100 microns thick, then the fusing agent can penetrate 100 microns into the polymer powder. Thus the fusing agent can heat the polymer powder throughout the entire layer so that the layer can coalesce and bond to the layer below. In further examples, the fusing agent can penetrate more deeply that a single layer. Melting the polymer of layer below the top layer can help to increase adhesion between the individual layers in some cases. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. Preheating can be accomplished with a lamp or lamps, an oven, a heated support bed, or other types of heaters. In some examples, the entire powder bed can be heated to a substantially uniform temperature.

Depending on the amount of metal oxide nanoparticles present in the polymer powder, the absorbance of the metal oxide nanoparticles, the preheat temperature, and the melting or softening point of the polymer, an appropriate amount of irradiation can be supplied from the radiant energy source. In some examples, the radiant energy source can irradiate each layer from about 0.5 to about 10 seconds per pass. In other examples, a stationary radiant energy source can be activated for a time period from about 0.1 second to about 5 seconds to irradiate the entire powder bed simultaneously.

The 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. In certain examples, the 3D object model can define the three-dimensional shape of the article and the three-dimensional shape of areas of the powder bed to be jetted with detailing agent. In other examples, the article can be defined by a first 3D object model a second 3D object model can define areas to jet the detailing agent. In further examples, the jetting of the detailing agent may not be controlled using a 3D object model, but using some other parameters or instructions to the 3D printing system. Other information may also be included in 3D object models, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The metal oxide nanoparticles can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if each numerical value and sub-range is explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Examples

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

A fusing agent was prepared that included water, an organic co-solvent, surfactant, and titanium dioxide nanoparticles having an average particle size of 50 nm. The fusing agent was printed on a 400 μm thick layer of a powder bed material over a glass substrate. The powder bed material consisted of a polyamide 12 powder.

In different experiments, the layer of powder bed material was either held at room temperature (25° C.) or at 140° C. It was found that jetting fusing agent onto powder at temperatures from about 40° C. to about 130° C. would disturb the surface of the powder due to the evaporation of water in the fusing agent droplets. However, at lower temperatures and higher temperatures this phenomenon stopped. The fusing agent was applied with an inkjet printhead to form a rectangle shape. After printing the fusing agent, the layer was exposed to UV radiation. A Phoseon FireJet™ FJ200 UV LED array (Phoseon Technology, Oregon) was positioned about 4 mm above the layer of polyamide powder. The intensity of UV radiation could be adjusted by changing the current to the LED array. The intensity of radiation was found to drop off as distance away from the LED array increased. It is estimated that the actual intensity of UV radiation at the surface of the polyamide powder layer was about 75% to 80% of the nominal intensity. The nominal intensity of the LED array ranged from 0 to 16 W/cm$^2$ of radiation at a wavelength centered at 395 nm (FWHM=10 nm).

A series of samples were made by jetting fusing agent onto polyamide 12 powder and irradiated with UV radiation. The amount of fusing agent applied, the preheat temperature, and the irradiation intensity were varied for the various samples. Three control samples were prepared by irradiating a layer of polyamide 12 powder without any fusing agent printed thereon.

The three control samples (a)-(c) were irradiated at an intensity of (a) 16 W/cm$^2$ for 10 seconds; (b) 16 W/cm$^2$ for 5 seconds; and (c) 12 W/cm$^2$ for 2 seconds. The powder remained completely loose and unfused after each of the irradiation treatments.

The samples printed with fusing agent were made with the following parameters: number of passes with the inkjet pen (i.e., relative amount of fusing agent that was applied. This parameter was set at 10 passes, 5 passes, 3 passes, or 2 passes in various samples); preheat temperature (either 25° C. or 140° C.); and irradiation intensity (12, 8, or 4.8 W/cm$^2$. All irradiation was performed for 1 second).

The following observations were made about the experimental samples. Thermal stress was observed in the samples preheated to 25° C. The thermal stress made the fused area have a wavy shape. This was not observed in the samples preheated to 140° C.

All of the samples printed with fusing agent had sufficient mechanical strength to be removed from the layer of polyamide 12 powder. The samples that were preheated to 25° C. were more elastic. This is likely due to the presence of organic compounds remaining in the powder that would have evaporated from the powder preheated to 140° C.

The experimental results indicate that the titanium dioxide nanoparticle fusing agent can be successfully used to fuse polyamide 12 powder, with better selectivity than other fusing agents. Additionally, the polyamide powder does not degrade when exposed to the 395 nm UV radiation used to heat the titanium dioxide nanoparticles. The titanium dioxide fusing may be used to produce white or colored 3D printed articles if additional colored agents are used.

What is claimed is:

1. A multi-fluid kit for three-dimensional printing, comprising:

a fusing agent consisting of:

water;

metal oxide nanoparticles dispersed in the water, the metal oxide nanoparticles selected from the group consisting of titanium dioxide nanoparticles, zinc oxide nanoparticles, cerium oxide nanoparticles, and a combination thereof, wherein the metal oxide nanoparticles have an average particle size ranging from about 2 nm to about 500 nm; and optionally, at least one additive selected from the group consisting of a dispersant, a co-solvent, a surfactant, a biocide, and a sequestering agent; and a detailing agent comprising a detailing compound.

2. The multi-fluid kit of claim 1, wherein the metal oxide nanoparticles are present in the fusing agent in an amount ranging from about 0.5 wt % to about 30 wt %.

3. The multi-fluid kit of claim 1, further comprising a colored agent separate from the fusing agent and the detailing compound, the colored agent comprising water and a colorant.

4. The multi-fluid kit of claim 1, wherein the metal oxide nanoparticles consist of metal oxide nanoparticles having an average particle size ranging from greater than 10 nm to about 500 nm.

5. The multi-fluid kit of claim 1, wherein the metal oxide nanoparticles consist of metal oxide nanoparticles having an average particle size ranging from about 50 nm to about 60 nm.

6. The multi-fluid kit of claim 1, wherein the detailing compound is a solvent that evaporates at a temperature ranging from about 90° C. to about 200° C.

7. The multi-fluid kit of claim 1, wherein the co-solvent is selected from the group consisting of 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol, and 1,5-pentanediol.

8. The multi-fluid kit of claim 1, wherein the surfactant is selected from the group consisting of a liponic ester and sodium dodecylsulfate.

9. The multi-fluid kit of claim 1, wherein the metal oxide nanoparticles are the titanium dioxide nanoparticles.

10. The multi-fluid kit of claim 9, wherein the titanium dioxide nanoparticles have an average particle size ranging from about 50 nm to about 60 nm.

\* \* \* \* \*